Dec. 26, 1939.  C. F. ADAMS  2,184,510
STAMPING WHEEL
Filed Jan. 24, 1938  2 Sheets-Sheet 1
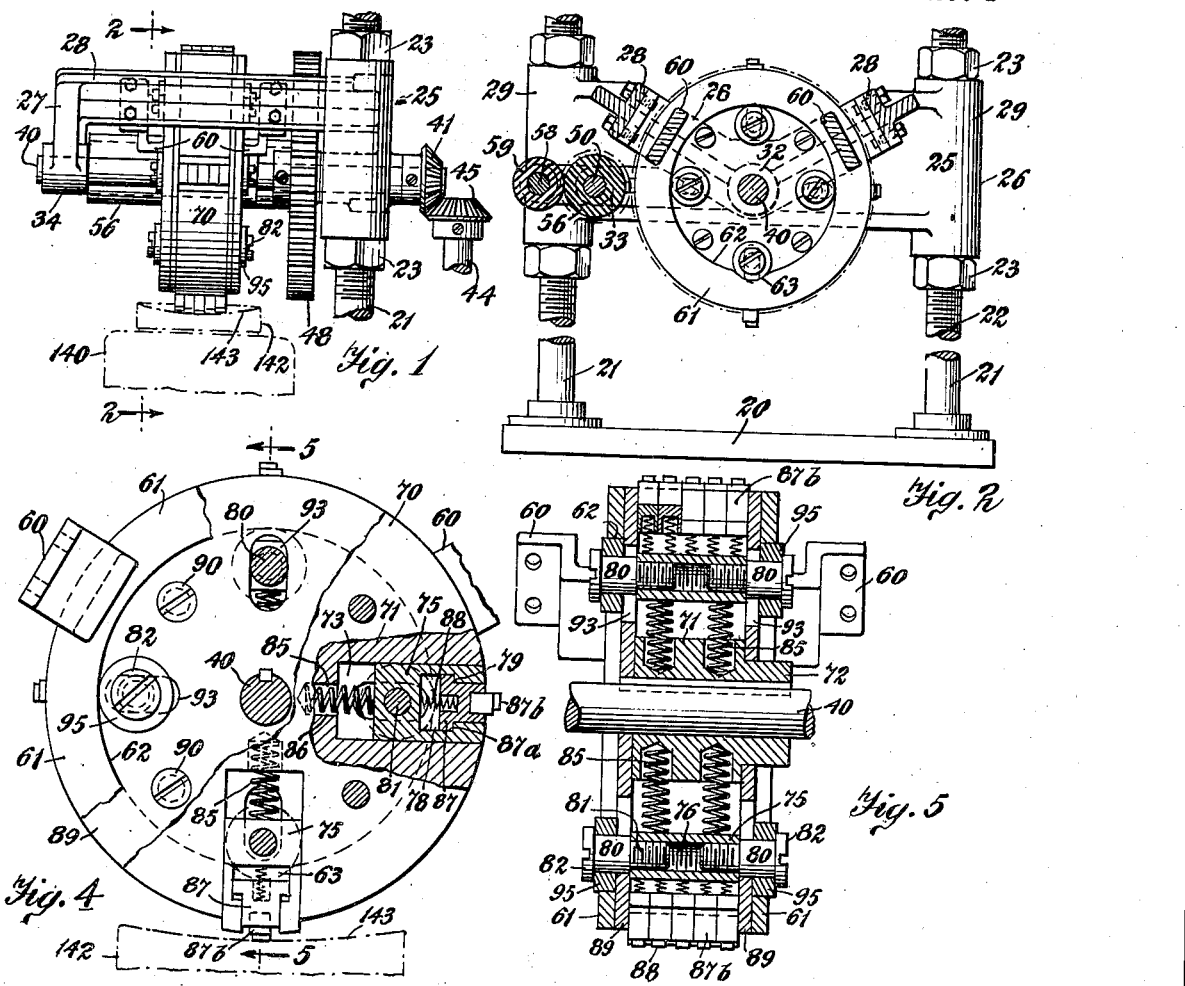
INVENTOR.
CHARLES F. ADAMS
By- A A de Bonneville
ATTORNEY.

Dec. 26, 1939.   C. F. ADAMS   2,184,510
STAMPING WHEEL
Filed Jan. 24, 1938   2 Sheets-Sheet 2
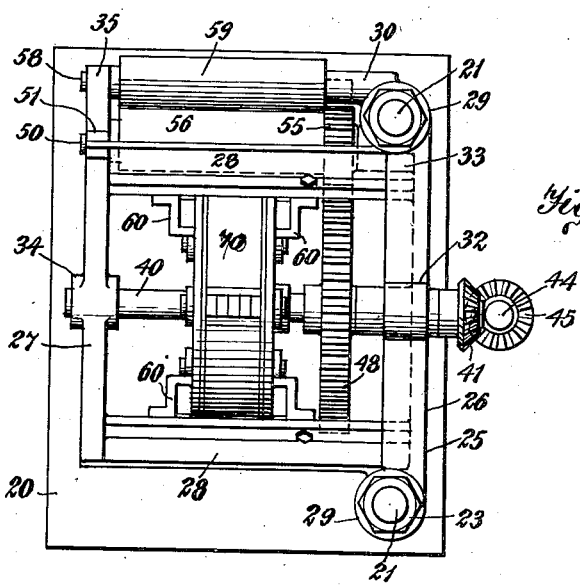
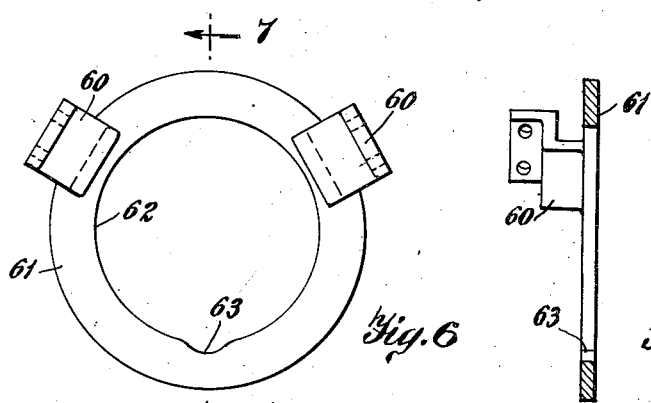
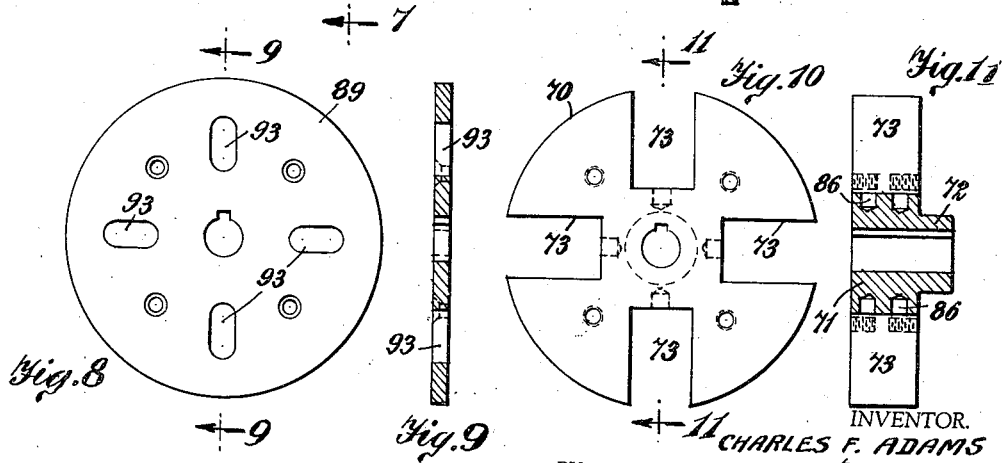
INVENTOR.
CHARLES F. ADAMS
BY
A A de Bonneville
ATTORNEY.

Patented Dec. 26, 1939

2,184,510

UNITED STATES PATENT OFFICE 2,184,510

STAMPING WHEEL

Charles F. Adams, New York, N. Y.

Application January 24, 1938, Serial No. 186,577

4 Claims. (Cl. 101—379)

This invention relates to a stamping wheel.

The essential object of the invention is the production of a stamping wheel, wherewith objects having flat, concave, convex or various other formed surfaces can have printed thereon, letters, numerals, various legends and the like, without blurring the same.

The second object of the invention is the production of means wherewith the surfaces of various objects whether flat or otherwise can be easily indented with letters, numerals, legends and the like without disfiguring the indentations.

The organization of the invention comprises a stamping wheel which is rotated, and carries type which are directed against the surfaces to be operated upon and controlled by stationary cams, so that the type are moved in directions perpendicular to and from the objects operated upon to avoid blurring or disfiguring the latter.

In the drawings Fig. 1 represents a front view of the stamping wheel with its supporting frame; Fig. 2 shows a section of Fig. 1 as on the line 2, 2; Fig. 3 indicates a top view of Fig. 1; Fig. 4 is an enlarged side view of the stamping wheel with a portion broken away and a portion in vertical section; Fig. 5 shows a section of Fig. 4 on the line 5, 5; Fig. 6 shows a front view of the stationary cam indicated in Figs. 1 to 5; Fig. 7 is a section of Fig. 6 on the line 7, 7; Fig. 8 shows an elevation on a reduced scale of one of the discs of the stamping wheel; Fig. 9 is a section of Fig. 8 on the line 9, 9; Fig. 10 shows an elevation on a reduced scale of the body portion of the stamping wheel and Fig. 11 is a section of Fig. 10 on the line 11, 11.

Referring to the drawings the support for the stamping wheel comprises the base plate 20, from which extend the two supporting rods 21, threaded at their upper portions as indicated at 22 for the nuts 23, to position the frame of the stamping wheel at different levels.

The frame for the support is designated in its entirety by the numeral 25.

The said frame 25 comprises the main member 26, the member 27, parallel to 26 and the cross members 28. The ends of the main member 26 are cylindrical as shown at 29 and have extending through them the rods 21. One of the ends 29 has integral therewith the journal bearing 30. The member 26 is shown with the journal bearings 32 and 33. The member 27 is indicated having the journal bearing 34 and the journal bearing 35. The cross members 28 connect the members 26 and 27. In the journal bearings 32 and 34 is supported the shaft 40. A driving shaft is indicated at 44 and has fastened thereto the bevel gear 45, which is in mesh with the bevel gear 41 fastened to the shaft 40. A spur gear 48 is fastened to the shaft 40. A shaft 50 has its ends journaled to the bearing 33 and in the bearing 51 in the member 27. On the shaft 50 is secured the pinion 55, which meshes with the spur gear 48. An inking roller 56 is fastened to the shaft 50. A shaft 58 is journaled in the journal bearings 30 and 35 and has fastened thereto the ink distributing roller 59, which bears against the roller 56.

Brackets 60 are bolted to the members 28, and stationary cams 61, each having the inner bearing edge 62 with the depression 63 are integral with the brackets 60.

Between the stationary cams 61 is positioned on the shaft 40 the stamping wheel 70. The said stamping wheel 70 is indicated with the body portion 71 having the projection 72, and in this instance the said wheel has four guide pockets 73. In each of the pockets 73 is slidably positioned a slide 75. Through each slide 75 extends the threaded opening 76. At the outer end of each slide 75 is indicated the opening 78 with the stop shoulders 79. In the threaded openings 76 are secured the bolts 80 having the threaded shanks 81. The heads of the bolts are indicated at 82. Main springs 85 are located in the pockets 73 and at one end extend into the cavities 86 extending from the pockets 73. The other ends of the springs 85 bear against the main slides 75. In the openings 78 are slidably supported the type plugs 87, each having the shoulders 87a, and in this instance five type plugs are shown. Each type plug 87 carries a type 87b. A spring 88 bears against the bottom of a cavity in each type plug 87 and the adjacent face of the opening 78.

A pair of discs 89 bear against the outer faces of the body portion 71 and are secured thereto by means of the screws 90.

In each of the discs 89 are indicated the elongated openings 93 through which the bolts 80 extend. On the outer ends of the bolts 80 are rotatively supported the rollers 95. The rollers 95 ride on the inner bearing edges 62 of the cams 61 and the inner edges of the depressions 63.

In Fig. 1 a jar is indicated in dotted lines at 140 with the cap 142 having the concaved upper wall 143. The said jar is moved in proper position by means not shown.

To operate the stamping wheel 70, the jar 140 with its cap 142 is placed in proper position under the stamping wheel 70 by means not shown. The driving shaft 44 is rotated by means not shown, by virtue of which the shaft 40 and the stamping wheel 70 are turned. The spur gear 48 turns with the shaft 40 and the pinion 55 is thereby turned. The inking roller 56 turns with the pinion 55 and the ink distributing roller 59 contacting with the roller 56 is turned. Ink is applied to the roller 59 by means not shown. During the rotations of the stamping wheel 70, the main springs 85 force the slides 75 to move and thereby the type plugs 87 with the type 87b move toward the circumference of the stamping wheel 70, but their positions are controlled by the contact of the rollers 95 with the inner bearing edges 62 of the stationary cams 61. When the rollers 95 reach the depressions 63 of the cams 60, the main slides 75 with the type 87b are instantly pushed outwardly and the type 87b contact with upper wall 143 of the cap 142 of the jar 140, and print or stamp the letters or numbers and the like on said wall 143, irrespective of the conformation of the said walls. As soon as the rollers 95 leave the depression 63, the type 87b are withdrawn from the walls 143 of the caps 142. It will be noted that the contact of the type 87b with the caps 142 is only for an instant and thereby the letters and the like printed on the walls 143 of the caps 142 are not blurred.

Various modifications may be made in the invention and the present exemplification is to be taken as illustrative and not limitative thereof.

Having described my invention I claim:

1. In a stamping wheel the combination of a body portion, a slide supported in said body portion, type for the slide, flexible means to move the slide to a predetermined position, a roller journaled at each side of the slide, and stationary means at the opposite sides of the wheel for the rollers to bear against, each of the latter means having a depression for the adjacent roller to bear against, said flexible means forcing the rollers of its slide to contact with said depressions, to move the slide with its type radially from the axis of the wheel to print on objects having flat or irregular surfaces.

2. In a stamping wheel the combination of a body portion, a slide supported in said body portion, type supported by the slide, flexible means to force the slide radially from the axis of the wheel, a stationary cam at the opposite sides of the wheel, each cam having an inner bearing edge with a depression and a roller journaled at each side of the slide bearing against the bearing edge of the adjacent cam maintaining the slide at a predetermined distance from the axis of the wheel, said slide with its type forced outwardly from the axis of the wheel with the entrance of said rollers into the depressions of said cams to print on flat, convex, concave or various irregular shaped surfaces of various objects.

3. In an apparatus of the character described the combination of a support, a slide supported in the support, type for the slide, springs in said support to move the slide outwardly therefrom, a roller journaled at the opposite sides of the slide and stationary means at the opposite sides of the support for the rollers to bear against, each of the stationary means having a depression for the adjacent roller to bear against, said springs forcing the rollers of the slide to contact with said depressions, to move the slide with its type from the support to print an object having flat or irregular surfaces.

4. In a stamping wheel the combination of a body portion having guide pockets, a slide supported in each guide pocket, each slide having an opening with shoulders at one end, springs in each pocket bearing between the slide therein and a wall of the pocket to force the slides radially from the axis of the wheel, a type plug slidably supported in the opening of each slide, each type plug having shoulders coacting with the shoulders of the opening of its slide, a spring bearing between each type plug and a wall of its slide, a type supported by each type plug, a stationary cam at the opposite sides of the wheel, each cam having an inner bearing edge with a depression and a roller journaled at each side of each slide bearing against the adjacent bearing edge of one of the cams to maintain the slide in proper position relatively to the axis of the wheel, said slides with their type forced outwardly from the axis of the wheel upon the entrance of said rollers into the depressions of said cams, to print on flat, convex, concave or other various shaped surfaces of objects operated upon.

CHARLES F. ADAMS.